(12) United States Patent
Xu et al.

(10) Patent No.: US 9,556,004 B2
(45) Date of Patent: Jan. 31, 2017

(54) APPARATUS, SYSTEM, AND METHOD FOR CONTROLLING A HANDRAIL OF AN ESCALATOR

(71) Applicant: KONE CORPORATION, Helsinki (FI)

(72) Inventors: Bo Xia Xu, Jiangsu (CN); Tai Lai Zhou, Jiangsu (CN); Cai Xiao Liang, Jiangsu (CN)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 15/017,895

(22) Filed: Feb. 8, 2016

(65) Prior Publication Data
US 2016/0152447 A1 Jun. 2, 2016

Related U.S. Application Data

(63) Continuation of application No. PCT/CN2013/081228, filed on Aug. 9, 2013.

(51) Int. Cl.
| | |
|---|---|
| B66B 25/00 | (2006.01) |
| H02P 21/20 | (2016.01) |
| B66B 23/04 | (2006.01) |
| B66B 23/24 | (2006.01) |
| G05B 19/416 | (2006.01) |

(52) U.S. Cl.
CPC ............. *B66B 23/04* (2013.01); *B66B 23/24* (2013.01); *B66B 25/00* (2013.01); *B66B 25/003* (2013.01); *G05B 19/416* (2013.01); *H02P 21/20* (2016.02); *G05B 2219/36585* (2013.01)

(58) Field of Classification Search
CPC ........ B66B 23/24; B66B 25/003; H02P 21/20; G05B 19/416
See application file for complete search history.

(56) References Cited

U.S. PATENT DOCUMENTS

| | | | | |
|---|---|---|---|---|
| 5,325,460 A | * | 6/1994 | Yamada | H02P 21/20 318/599 |
| 6,119,845 A | * | 9/2000 | Song | B66B 23/026 198/331 |
| 6,155,401 A | * | 12/2000 | Lunardi | B66B 23/026 198/322 |

(Continued)

FOREIGN PATENT DOCUMENTS

| | | |
|---|---|---|
| CN | 10-194650 A | 7/1998 |
| CN | 2685302 Y | 3/2005 |

(Continued)

*Primary Examiner* — Thomas Randazzo
(74) *Attorney, Agent, or Firm* — Birch, Stewart, Kolasch & Birch, LLP (57) ABSTRACT

A handrail drive inverter for an escalator can include a memory configured to store instructions, a processor coupled to the memory, an input configured to receive a main speed control signal that corresponds to the speed of a main drive motor of the escalator, and an output configured to provide a handrail speed control signal for a handrail drive motor based on the instructions in the memory. The processor is configured to calculate a torque output of the handrail drive motor and determine the handrail speed control signal as a function of the torque output and a feedback of the handrail speed control signal constrained by at least one of an upper limit and a lower limit, the upper limit and the lower limit being determined from the main speed control signal.

14 Claims, 5 Drawing Sheets

(56) References Cited

U.S. PATENT DOCUMENTS

| | | | |
|---|---|---|---|
| 6,781,333 B2* | 8/2004 | Koide | H02P 21/00 |
| | | | 318/432 |
| 7,063,203 B2* | 6/2006 | Gonzalez Alemany | B66B 23/04 |
| | | | 198/334 |
| 7,954,620 B2* | 6/2011 | Winkelhake | A61K 31/4985 |
| | | | 198/330 |
| 9,136,788 B2* | 9/2015 | Okubo | H02P 21/0039 |
| 9,136,790 B2* | 9/2015 | Park | H02P 27/06 |
| 9,166,512 B2* | 10/2015 | Sonoda | G05B 13/04 |
| 2014/0176028 A1* | 6/2014 | Tobari | B60L 15/20 |
| | | | 318/400.02 |

FOREIGN PATENT DOCUMENTS

| | | |
|---|---|---|
| CN | 102372202 A | 3/2012 |
| CN | 202245658 U | 5/2012 |
| JP | 9-240973 A | 9/1997 |

\* cited by examiner

APPARATUS, SYSTEM, AND METHOD FOR CONTROLLING A HANDRAIL OF AN ESCALATOR

CROSS REFERENCE TO RELATED APPLICATIONS

This application is a Continuation of PCT International Application No. PCT/CN2013/081228, filed on Aug. 9, 2013, all of which is hereby expressly incorporated by reference into the present application.

TECHNICAL FIELD

The present invention relates generally to an escalator, and particularly to an inverter for driving a handrail of an escalator.

BACKGROUND

The operation of escalators, and particularly the handrails of escalators, is well-known in the art. Generally, the motion of a handrail of an escalator is driven by connecting the main drive of the escalator to a friction wheel coupled to the handrail.

In some situations, for example in escalators of great length or steep incline, a single friction wheel driven by the main drive motor is insufficient to overcome the handrail friction and drive the handrail. In these situations, a second friction wheel, driven by a separate handrail motor, is used. However, these systems are often difficult to control. The speed required of the handrail motor depends greatly on the length and incline of the escalator. Any change to these parameters requires extensive reconfiguration. A closed-loop control system could be used to address such changes, but closed-loop systems are often expensive to implement, requiring additional hardware.

SUMMARY

According to one embodiment of the invention, a handrail drive inverter for an escalator can include a memory configured to store instructions, a processor coupled to the memory, an input configured to receive a main speed control signal that corresponds to the speed of a main drive motor of the escalator, and an output configured to provide a handrail speed control signal for a handrail drive motor based on the instructions in the memory. The processor can be configured to calculate a torque output of the handrail drive motor and determine the handrail speed control signal as a function of the torque output and a feedback of the handrail speed control signal constrained by at least one of an upper limit and a lower limit, the upper limit and the lower limit being determined from the main speed control signal.

According to a further embodiment of the invention, a method for controlling a handrail drive motor of an escalator with a handrail drive inverter can include receiving at the handrail drive inverter a main speed control signal that corresponds to the speed of a main drive motor of the escalator, determining a current state of a handrail speed control signal, calculating a torque output of a handrail drive motor based at least one of an output voltage, output current, and output frequency of the handrail drive inverter, and providing a handrail speed control signal for the handrail drive motor. The handrail speed control signal can be a function of the torque output and a feedback of the handrail speed control signal constrained by at least one of an upper limit or a lower limit, the upper limit and lower limit being determined from the main speed control signal.

According to a still further embodiment of the invention, an escalator handrail drive control system can include a signal-generating component configured to provide a main speed control signal that corresponds to the speed of a main drive motor of the escalator, a handrail drive inverter configured to receive the main speed control signal and provide a handrail speed control signal, and a handrail drive motor configured to receive the handrail speed control signal and drive a handrail based on the handrail speed control signal. The handrail drive inverter can be configured to calculate a torque output of the handrail drive motor, and wherein the handrail speed control signal is a function of the torque output and a feedback of the handrail speed control signal constrained by at least one of an upper limit and a lower limit, the upper limit and lower limit being determined from the main speed control signal.

Further aspects, objectives, and advantages, as well as the structure and function of embodiments, will become apparent from a consideration of the description, drawings, and examples.

BRIEF DESCRIPTION OF THE DRAWINGS

The features and advantages of the invention will be apparent from the following drawings wherein like reference numbers generally indicate identical, functionally similar, and/or structurally similar elements.

DETAILED DESCRIPTION

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without departing from the spirit and scope of the invention.

Figure 1:
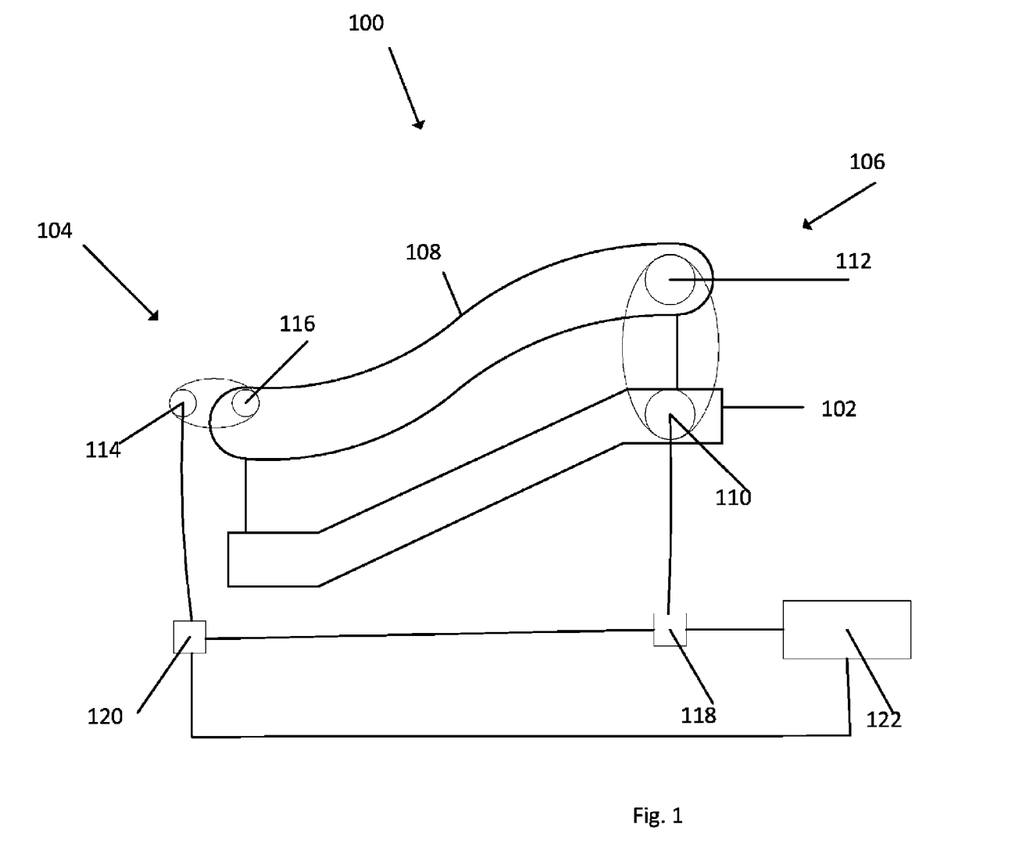
FIG. 1 is schematic of an embodiment of an escalator for implementing the invention.

Generally, FIGS. 1-5 refer to a system for driving a handrail of an escalator. FIG. 1 shows an embodiment of an escalator 100. Escalator 100 can include a conveyor or belt portion 102 drawing steps or pallets for transporting passengers between a first landing area 104 and a second landing area 106. Conveyor 102 can be of the endless articulated type, which is driven about a closed path or loop. Escalator 100 can also include a handrail 108. Handrail 108 can be a belt formed as an endless loop. Conveyor 102 can be driven by main drive motor 110. Main drive motor 110 can also be used to drive handrail 108 through the use of main handrail friction wheel 112. Main drive motor 110 can be coupled to main handrail friction wheel 112, for example through the use of a pulley or chain, so that when main drive motor 110 turns it causes main handrail friction wheel 112 to turn as well. Main handrail friction wheel 112 can be coupled to a portion of handrail 108 so that when main handrail friction wheel 112 turns, handrail 108 is caused to move through force of friction.

Still referring to FIG. 1, escalator 100 can also include handrail motor 114 and second handrail friction wheel 116. Handrail motor 114 can also be used to drive handrail 108 through the use of second handrail friction wheel 116. Handrail drive motor 114 can be coupled to second handrail friction wheel 116, for example through the use of a pulley or chain, so that when handrail drive motor 114 turns it causes second handrail friction wheel 116 to turn as well. Main handrail friction wheel 112 can be coupled to a portion of handrail 108 so that when second handrail friction wheel 116 turns, handrail 108 is caused to move through force of friction. In this way, handrail drive motor 114 can, through second handrail friction wheel 116, provide supplementary force to drive handrail 108 in situations where the force provided by main handrail friction wheel 112 alone is insufficient to drive handrail 108.

Main drive motor 110 and handrail drive motor 114 can be any suitable type of motor as desired, for example a variable-frequency electric motor. Main drive motor 110 and handrail drive motor 114 can receive control signals from main drive inverter 118 and handrail drive inverter 120, respectively. Main drive inverter 118 can be configured to receive control signals from a escalator controller 122. Handrail drive inverter 120 can be configured to receive control signals from escalator controller 122 and main drive inverter 118.

Main handrail friction wheel 112 and second handrail friction wheel 116 can be located at any point along handrail 108. For example, main handrail friction wheel 112 can be coupled to handrail 108 along a portion of handrail 108 which is located at landing 106, while second handrail friction wheel 116 can be coupled to handrail 108 along a portion of handrail 108 which is located at landing 104. This can allow main drive motor 110 and main drive inverter 118 to be located, for example, in a machinery pit located at landing 106, while allowing handrail drive motor 114 and handrail drive inverter 120 to be located in a machinery pit located at landing 104.

Figure 2:
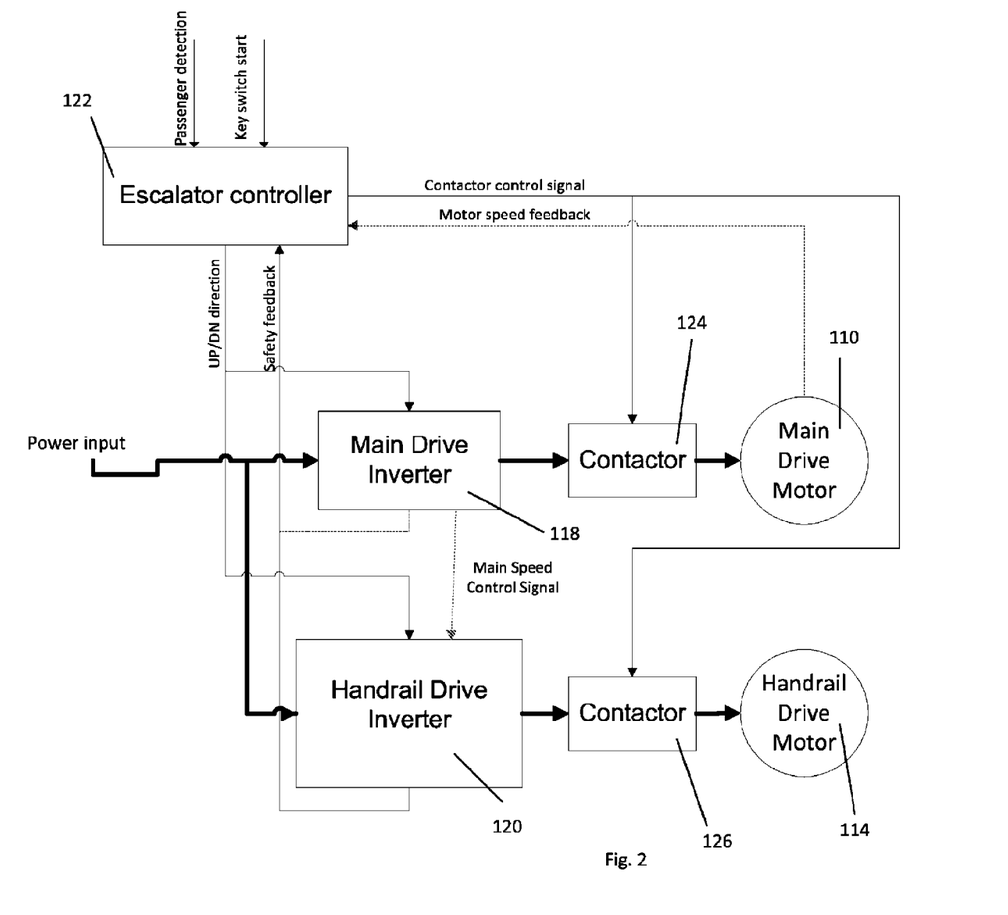
FIG. 2 is a block diagram of an embodiment of a control system for an escalator.

FIG. 2 shows a block diagram of a control system for an escalator. Escalator controller 122 can be any type of controller as desired, for example any type of computer, microcontroller, microprocessor, or other type of controller as desired. Main drive inverter 118 and handrail drive inverter 120 can be inverters which can be configured to control variable frequency electric motors. For example, main drive inverter 118 and handrail drive inverter 120 can control the speed of main drive motor 110 and handrail drive motor 114 by providing control signals which vary in frequency according to the desired speed of the motor to which they are connected. In some embodiments, main drive inverter 118 can be connected to main drive motor 110 through a relay, contactor, or any other type of connection device, for example a contactor 124. Similarly, handrail drive inverter 120 can be connected to handrail drive motor 114 through a relay, contactor, or any other type of connection device, for example a contactor 126. In some embodiments, main drive inverter 118 can be, for example, a Vacon NXL series or NXS series inverter. In further embodiments, handrail drive inverter 120 can be a Vacon NXL00055 2.2 kW inverter.

Escalator controller 122 can provide control signals to any of the other components of escalator 100 to control the operation of escalator 100. For example, escalator controller can provide signals to main drive inverter 118 and handrail drive inverter 120 which indicate the desired direction of travel for escalator 100. Escalator controller 122 can also provide control signals to any desired combination of main drive inverter 118 and handrail drive inverter 120 to indicate the desired speed of travel of main drive motor 110 or handrail drive motor 114. Escalator controller 122 can also provide control signals to, for example, contactors 124 and 126, which can be used to disconnect contactors 124 and 126 in case of an emergency.

Escalator controller 122 can provide these control signals based on input signals. These input signals can be, for example, signals which indicate whether a start key has been inserted to start escalator 100, or whether passengers are detected on escalator 100. Escalator controller 122 can also receive feedback signals from any of the other components of escalator 100. For example, escalator controller 122 can receive motor speed feeback signals from main drive motor 110 and safety feeback signals from main drive inverter 118 and handrail drive inverter 120.

Main drive inverter 118 can receive control signals from escalator controller 122. Based on the input from escalator controller 122, main drive inverter 118 can provide a main speed control signal to main drive motor 110, which can cause main drive motor 110 to turn at a desired speed. In some embodiments, main drive inverter 118 can also provide other types of signals, for example a signal that indicates the direction for main drive motor 110 to turn.

Handrail drive inverter 120 can receive control signals from main drive inverter 118, for example the main speed control signal, and can provide a handrail speed control signal to handrail drive motor 114, which can cause handrail drive motor 114 to turn at a desired speed. In some embodiments, handrail drive inverter 120 can also provide other types of signals, for example a signal that indicates the direction for handrail drive motor 114 to turn. In some embodiments, handrail drive inverter 120 can receive control signals such as main speed control signal from another component of escalator 100, for example escalator controller 122, or from any type of sensor such as a speed sensor or other source that can detect, for example, a speed of main drive motor 110 and emit a signal that corresponds to the speed of main drive motor 110.

Figure 3:
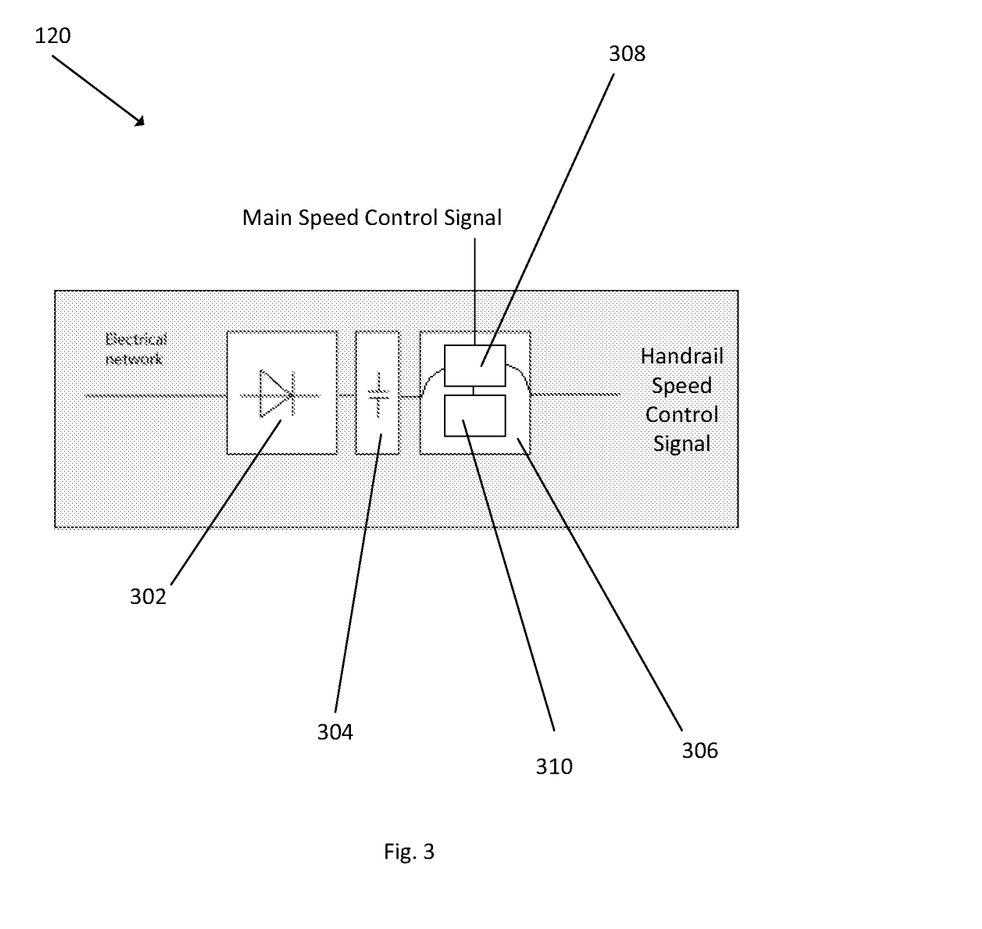
FIG. 3 is a schematic of a drive inverter for implementing the invention.

FIG. 3 shows an example of an embodiment of handrail drive inverter 120. Handrail drive inverter 120 can include rectifier 302, power circuitry 304, and control circuitry 306. Rectifier 302 can receive electrical power input, for example alternating current (AC) power from an electrical power network, and convert or otherwise condition the power input into direct current (DC) power suitable for use by the control circuitry 306. Power circuitry 304 can receive the DC power from rectifier 302 and store it for use by control circuitry 306. Power circuitry 304 can include, for example, batteries, capacitors, or any other type of power storage component. Control circuitry 306 can receive DC power from power circuitry 304, and can receive control signals, for example the main speed control signal from main drive inverter 118. Control circuitry 306 can use DC power from power circuitry 304 to construct and output one or more output signals, for example the handrail speed control signal.

Still referring to FIG. 3, control circuitry 306 can include a processor 308 which can interface with a memory 310. Processor 308 can receive control signals. These control signals can be, for example, main speed control signal, or any other type of control signal, for example a control signal that indicates a direction of an escalator main drive. In some embodiments, processor 308 can interpret control signals such as the main speed control signal based on instructions stored in memory 310 in order to construct output signals such as the handrail speed control signal. In some embodiments, processor 308 can use modulation techniques to construct the handrail speed control signal as a 3-phase AC signal suitable for driving handrail drive motor 114. Processor 308 can determine the desired attributes of the handrail speed control signal based on any desired configuration. For example, processor 308 can receive the main speed control signal from main drive inverter 118 and use the main speed control signal to calculate upper and lower limits of the handrail speed control signal. Processor 308 can take into account any other desired parameters to calculate the handrail speed control signal. For example, processor 308 can determine the current state of the handrail speed control signal in order to calculate an output torque of handrail drive motor 114 and use this in the determination of the desired output of the handrail speed control signal. In some embodiments, the handrail speed control signal output by processor 308, and therefore by handrail drive inverter 120, is a function of the torque output and a difference between the main speed control signal and a feedback of the handrail speed control signal.

In some embodiments, the instructions stored on memory 310 can be software which instructs processor 308 to determine the handrail speed control signal in a manner consistent with a proportional-integral-derivative (PID) controller. This can allow handrail drive inverter 120 to vary the handrail speed control signal based on the past and present behavior of the handrail speed control signal.

Figure 4:
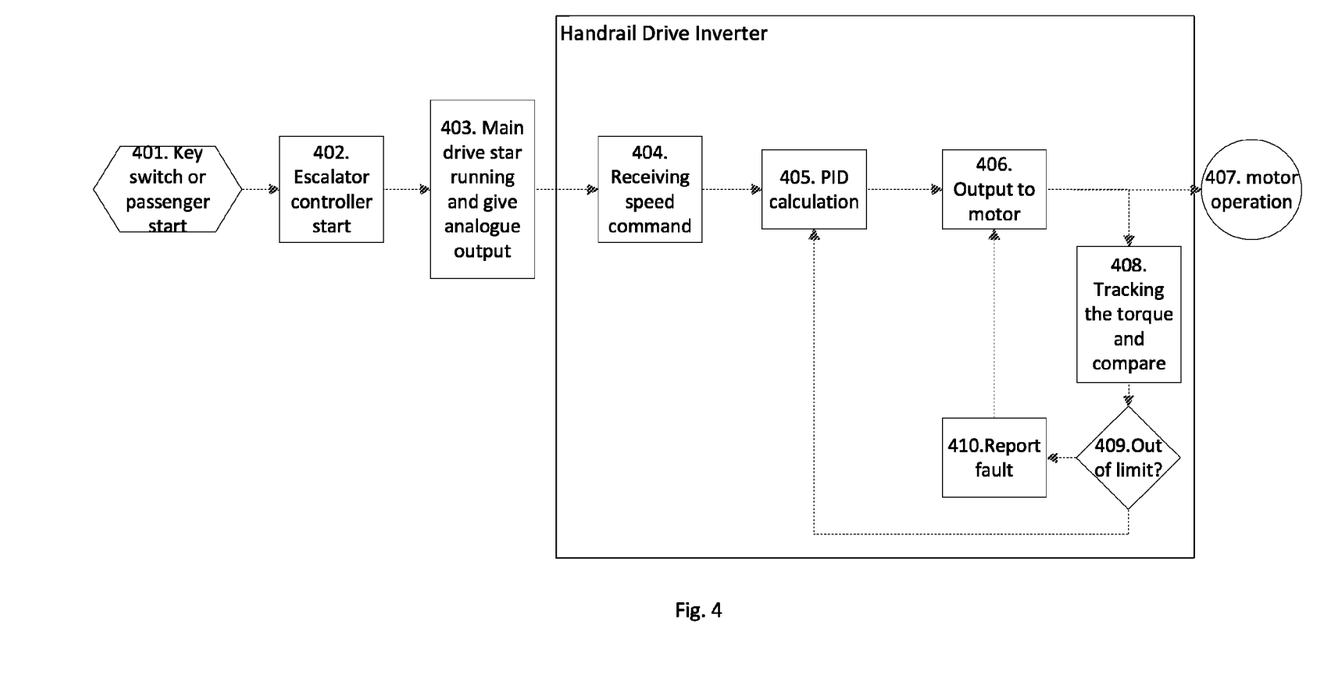
FIG. 4 is a flowchart for software to implement the drive inverter of the invention.

FIG. 4 shows an example of a flowchart for instructions which can instruct processor 308 to determine the handrail speed control signal. At Step 401, Escalator 100 can be in standby mode, or some other state awaiting instructions. Once a start key is inserted or a passenger is detected, escalator controller 122 can receives the signals indicating this. At Step 402, escalator controller 122 can send out speed and direction control signals to main drive inverter 118. At Step 403, main drive inverter 118 can start running operation and provide the main speed control signal to main drive motor 110 and handrail drive inverter 120. At Step 404, handrail drive inverter 120 can receives a direction control signal from escalator controller 122 and main speed signal from main drive inverter 118.

At Step 405, processor 306 of handrail drive inverter 120 can calculate the torque output of handrail drive motor 114. The calculated torque output can be calculated using, for example, the current state of the handrail speed control signal, or an output voltage, output current, or output frequency of handrail drive inverter 120, or any other parameter as desired. The processor 306 can then calculate the handrail speed control signal using the main speed control signal and the calculated handrail torque output using, for example, a Proportional-Integral-Derivative (PID) controller. For example, if the calculated torque output is lower than a target torque output, then the frequency of the handrail speed control signal can be increased. If the calculated torque output is higher than the target torque output, then the frequency of the handrail speed control signal can be decreased.

This target torque output can be determined based on any number of factors or parameters, including but not limited to main speed control signal. The target torque output can be adjusted automatically and gradually based on the current running situation of escalator 100 as determined based on, for example, the main speed control signal or a feedback of the handrail speed control signal. Handrail drive inverter 120 can constrain the parameters used to calculate the handrail speed control signal so that handrail drive inverter 120 only supplies control signals to handrail drive motor 114 that produce torques in a range from zero torque to a predetermined maximum acceptable torque $\tau_A$. $\tau_A$ can be selected to be a positive torque value, so that the torque output of handrail drive motor 114 can always remain positive. In this way, handrail drive motor 114 can be prevented from providing negative torque, which would cause it to work against main drive motor 110 and cause undesirable bowing or bunching of handrail 108, and can also be prevented from providing too much torque, which could cause undue wear on the components of escalator 100. In some embodiments, the main speed control signal from main drive inverter 118 is not used directly for the handrail speed control signal calculation, but is instead used to set the upper and lower limit of the handrail speed control signal. At Step 406, handrail drive inverter 120 can provide the handrail speed control signal to handrail drive motor 114 if no fault has been reported. At Step 407, handrail drive motor 114 can receive the handrail speed control signal and begin operation.

At Step 408, processor 306 of handrail drive inverter 120 can compare the torque output of handrail drive motor 114 to the target torque output. At Step 409, handrail drive inverter 120 can determine whether the output torque is outside of a safe or desired range, for example outside of range between 0 and $\tau_A$. If it is within a safe or desired range, handrail drive inverter 120 can return to Step 405. If the torque output is not within a safe or desired range, at Step 410, handrail drive inverter 120 can stop handrail drive motor 114 and report a fault to escalator controller 122. Additionally, handrail drive inverter 120 can compare the handrail speed control signal to an upper or lower limit determined from main speed control signal. If handrail speed control signal is above the upper limit or below the lower limit, handrail drive inverter 120 can stop handrail drive motor 114 and report a fault to escalator controller 122.

Figure 5:
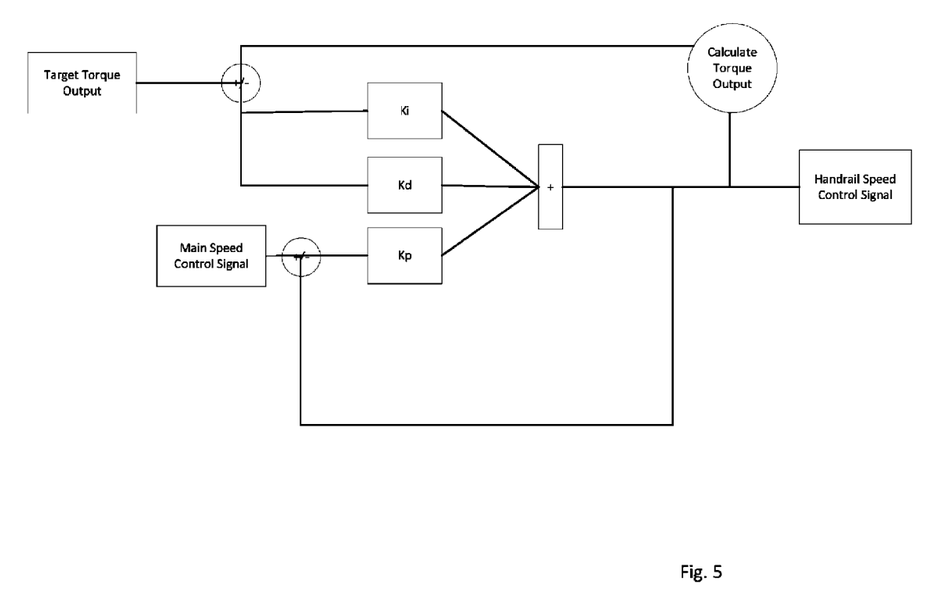
FIG. 5 is a block diagram of an embodiment of a proportional-integral-derivative controller used in controlling the operation of an escalator.

FIG. 5 shows a functional block diagram of software stored in memory 310 that is consistent with a PID controller. In this block diagram, $K_p$ is a proportion coefficient, $K_i$ is an integration coefficient, $K_d$ is a differential coefficient. The operation of a PID controller is well-known in the art, demonstrated for example on the web page: http://en.wikipedia.org/wiki/PID_controller. Using such a PID controller, handrail drive inverter 120 can avoid undesirably large swings of the handrail speed control signal which can cause improper operation of handrail 108.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:
1. A handrail drive inverter for an escalator, comprising:
a memory configured to store instructions;
a processor coupled to the memory and including an input configured to receive a main speed control signal that corresponds to the speed of a main drive motor of the escalator, and an output configured to provide a hand- rail speed control signal for a handrail drive motor based on the instructions in the memory;

wherein the processor is configured to calculate a torque output of the handrail drive motor and determine the handrail speed control signal as a function of the torque output and a feedback of the handrail speed control signal constrained by at least one of an upper limit and a lower limit, the upper limit and the lower limit being determined from the main speed control signal.

2. The handrail drive inverter of claim 1, wherein the handrail speed control signal is constrained so that the torque output remains in the range of 0 to $\tau_A$, where $\tau_A$ is a predetermined positive torque output.

3. The handrail drive inverter of claim 1, wherein the processor is configured by the instructions to execute a proportional-integral-derivative controller to determine the handrail speed control signal.

4. The handrail drive inverter of claim 3, wherein the proportional-integral-derivative controller uses a proportional coefficient associated with the main speed control signal and an integral coefficient and a derivative coefficient which are associated with the calculated torque output.

5. A method for controlling a handrail drive motor of an escalator with a handrail drive inverter, comprising:

receiving at the handrail drive inverter a main speed control signal that corresponds to the speed of a main drive motor of the escalator;

determining a current state of a handrail speed control signal;

calculating a torque output of a handrail drive motor based at least one of an output voltage, output current, and output frequency of the handrail drive inverter; and providing a handrail speed control signal for the handrail drive motor, wherein the handrail speed control signal is a function of the torque output and a feedback of the handrail speed control signal constrained by at least one of an upper limit or a lower limit, the upper limit and lower limit being determined from the main speed control signal.

6. The method claim 5, wherein the handrail speed control signal is constrained so that the torque output remains in the range of 0 to $\tau_A$, where $\tau_A$ is a predetermined positive torque output.

7. The method claim 5, wherein the handrail speed control signal is defined by a proportional-integral-derivative controller.

8. The method of claim 7, wherein the proportional-integral-derivative controller uses a proportional coefficient associated with the main speed control signal and an integral coefficient and a derivative coefficient which are associated with the calculated torque output.

9. An escalator handrail drive control system, comprising:

a signal-generating component configured to provide a main speed control signal that corresponds to the speed of a main drive motor of the escalator;

a handrail drive inverter configured to receive the main speed control signal and provide a handrail speed control signal; and a handrail drive motor configured to receive the handrail speed control signal and drive a handrail based on the handrail speed control signal, wherein the handrail drive inverter is configured to calculate a torque output of the handrail drive motor, and wherein the handrail speed control signal is a function of the torque output and a feedback of the handrail speed control signal constrained by at least one of an upper limit and a lower limit, the upper limit and lower limit being determined from the main speed control signal.

10. The escalator handrail drive control system of claim 9, wherein the handrail speed control signal is constrained so that the torque output remains in the range of 0 to $\tau_A$, where $\tau_A$ is a predetermined positive torque output.

11. The escalator handrail drive control system of claim 9, wherein the handrail speed control signal is defined by a proportional-integral-derivative controller.

12. The escalator handrail drive control system of claim 11, wherein the proportional-integral-derivative controller uses a proportional coefficient associated with the main speed control signal and an integral coefficient and a derivative coefficient which are associated with the calculated torque output.

13. The escalator handrail drive control system of claim 9, wherein the signal-generating component is a main drive inverter of the escalator.

14. The escalator handrail drive control system of claim 9, wherein the signal-generating component is a sensor configured to detect a speed of a main drive motor of the escalator.

* * * * *